(12) United States Patent
Wang et al.

(10) Patent No.: US 11,845,683 B2
(45) Date of Patent: Dec. 19, 2023

(54) METHOD AND SYSTEM FOR VERTICALLY UTILIZING UNCONVENTIONAL WATER SOURCE

(71) Applicant: Nanjing Hydraulic Research Institute, Jiangsu (CN)

(72) Inventors: Xiaojun Wang, Jiangsu (CN); Jianyun Zhang, Jiangsu (CN); Feng Chen, Jiangsu (CN)

(73) Assignee: Nanjing Hydraulic Research Institute, Nanjing (CN)

( * ) Notice: Subject to any disclaimer, the term of this patent is extended or adjusted under 35 U.S.C. 154(b) by 106 days.

(21) Appl. No.: 17/515,390

(22) Filed: Oct. 29, 2021

(65) Prior Publication Data

US 2022/0162105 A1 May 26, 2022

(30) Foreign Application Priority Data

Nov. 26, 2020 (CN) .......................... 202011344270.6

(51) Int. Cl.
| | |
|---|---|
| *C02F 9/00* | (2023.01) |
| *E03B 1/04* | (2006.01) |
| *C02F 1/00* | (2023.01) |
| *C02F 1/28* | (2023.01) |
| *C02F 1/32* | (2023.01) |
| *C02F 3/26* | (2023.01) |
| *C02F 103/00* | (2006.01) |

(52) U.S. Cl.
CPC ................ *C02F 9/00* (2013.01); *E03B 1/041* (2013.01); *C02F 1/001* (2013.01); *C02F 1/28* (2013.01); *C02F 1/325* (2013.01); *C02F 3/26* (2013.01); *C02F 2103/001* (2013.01); *C02F 2103/002* (2013.01); *C02F 2103/005* (2013.01); *C02F 2209/02* (2013.01); *C02F 2303/04* (2013.01); *E03B 2001/045* (2013.01); *E03B 2001/047* (2013.01)

(58) Field of Classification Search
None
See application file for complete search history.

(56) References Cited

U.S. PATENT DOCUMENTS

2005/0218071 A1* 10/2005 Austin ...................... C02F 3/10
    210/150
2016/0376166 A1* 12/2016 Lawryshyn ............... C02F 1/32
    210/709

* cited by examiner

*Primary Examiner* — Mohammad Ali
*Assistant Examiner* — Saad M Kabir (57) ABSTRACT

Disclosed are a method and system for vertically utilizing unconventional water source. The system includes a water collection unit, a water treatment unit, and a monitoring, regulation and reuse unit. The water collection unit is configured to collect rainwater and/or domestic wastewater; the water treatment unit is in communication with the water collection unit and configured to purify the rainwater and/or the domestic wastewater collected by the water collection unit; and the monitoring, regulation and reuse unit is in communication with the water treatment unit and configured to use reclaimed water obtained through treatment by the water treatment unit. The method and the system for vertically utilizing unconventional water source in the present disclosure have advantages of a simple structure, low costs, and high treatment efficiency, effectively save energy and water resources, and are suitable for decentralized treatment and recycling of urban domestic wastewater.

9 Claims, 6 Drawing Sheets

METHOD AND SYSTEM FOR VERTICALLY UTILIZING UNCONVENTIONAL WATER SOURCE

CROSS REFERENCE TO RELATED APPLICATIONS

The present application claims the benefit of Chinese Patent Application No. 202011344270.6 filed on Nov. 26, 2020, the contents of which are incorporated herein by reference in their entirety.

TECHNICAL FIELD

The present disclosure relates to the field of development and comprehensive utilization of water resources, and more specifically, to a method and system for vertically utilizing unconventional water source.

BACKGROUND

At present, most buildings (such as high-rise buildings or parking buildings) generally have a vertical greening landscape to improve a visual effect. An irrigation water source of a greening landscape apparatus mostly depends on municipal water supply networks and may lead to excessive consumption of water resources and energy. With the development of science and technology, a scheme of reusing reclaimed water is adopted for some vertical greening design. In this scheme, after domestic wastewater (sewage) of residents in a community is treated in a centralized manner to meet a discharge requirement, it is pressurized and transmitted to different water use sites. However, this scheme requires high energy consumption, increases irrigation costs, and has problems such as uneven irrigation and large water consumption. How to reduce the consumption in a reclaiming process and utilize unconventional water sources efficiently is an urgent problem to be resolved. At present, there are only a few configuration schemes for three-dimensional vertical precise irrigation. Therefore, based on a demand for precise irrigation and drainage control of a flexible externally-covered water-fertilizer integration system proposed by the inventor, a method and system for vertically utilizing unconventional water source are proposed.

SUMMARY

An objective of the present disclosure is to provide a method and system for vertically utilizing unconventional water source, to resolve technical problems such as high energy consumption, large water resource consumption, inability to effectively carry out three-dimensional precise irrigation, drainage, drainage control, and the like in a reclaiming process in an existing water reclamation scheme.

To achieve the above objective, the present disclosure adopts the following technical solutions. A system for vertically utilizing unconventional water source is provided, including:
- a water collection unit, configured to collect rainwater and/or domestic wastewater;
- a water treatment unit, in communication with the water collection unit and configured to purify the rainwater and/or the domestic wastewater collected by the water collection unit; and
- a monitoring, regulation and reuse unit, in communication with the water treatment unit and configured to use reclaimed water obtained through treatment by the water treatment unit.

In another embodiment of the present disclosure, the water treatment unit includes:
- a biological reaction tank, in communication with the water collection unit;
- a filler, disposed in the biological reaction tank and used as a biofilm carrier;
- an aeration apparatus, configured to fill oxygen into liquid in the biological reaction tank; and
- a temperature regulation member, disposed in the biological reaction tank and configured to regulate a temperature in the biological reaction tank.

In another embodiment of the present disclosure, the water treatment unit further includes an adsorption and filtration member configured to remove a suspended substance in the reclaimed water.

In another embodiment of the present disclosure, the monitoring, regulation and reuse unit includes:
- a reservoir;
- a water pump, disposed in the reservoir; and
- a communication pipe, where one end of the communication pipe is in communication with the reservoir, and the other end of the communication pipe is configured to communicate with a community irrigation system and/or a non-drinkable water system.

In another embodiment of the present disclosure, the monitoring, regulation and reuse unit further includes a sterilization member configured to remove a microorganism in the reclaimed water and/or an allocation member configured to control irrigation and drainage processes.

In another embodiment of the present disclosure, the water collection unit includes:
- a rainwater collection member, disposed on a building roof and/or on the ground to collect the rainwater and transport the rainwater to the water treatment unit; and
- a domestic wastewater collection member, where one end of the domestic wastewater collection member is in communication with a sewer pipe in a building, and the other end of the domestic wastewater collection member is communicated with the water treatment unit.

In another embodiment of the present disclosure, the domestic wastewater collection member includes:
- a first blowdown pipe, where one end of the first blowdown pipe is in communication with a blowdown pipe in toilet, and the other end of the first blowdown pipe is in communication with the biological reaction tank; and
- a second blowdown pipe, where one end of the second blowdown pipe is in communication with a blowdown pipe in kitchen, and the other end of the second blowdown pipe is in communication with the absorption and filtration member.

In another embodiment of the present disclosure, the temperature regulation member includes:
- a hollow pipe, disposed in the biological reaction tank, where one end of the hollow pipe is in communication with the rainwater collection member, and the other end of the hollow pipe is in communication with the monitoring, regulation and reuse unit; and
- a heater strip, connected to an external power supply to heat the hollow pipe.

In an embodiment of the present disclosure, the hollow pipe is constituted by two pipes disposed coaxially. There is a gap formed between the two pipes, and two ends are sealed. The heater strip is disposed in the gap between the two pipes.

In another embodiment of the present disclosure, the monitoring, regulation and reuse unit further includes an auxiliary apparatus configured to monitor water quality, water amount, and water temperature, and a control and allocation system. According to a method for vertically utilizing unconventional water source provided in the present disclosure, the monitoring, regulation and reuse unit calculates water demand and water supply, and performs control and allocation for irrigation and drainage.

The present disclosure further provides a method for vertically utilizing unconventional water source, including the following steps:

calculating a sum of green plants water demand and other water demand;

calculating a sum of unconventional water supply such as rainwater and reclaimed water, and an amount of water for emergent replenishment; and performing control and allocation for irrigation and drainage processes.

The method for vertically calculating and allocating demand and supply of unconventional water source is as follows:

In the present disclosure, based on a flexible externally-covered integrated greening system proposed by the inventor, an unconventional water source system is disposed based on a site, slope, and characteristic of the greening. To make full use of potential energy of a three-dimensional altitude difference, based on a position of the unconventional water source (the rainwater, the reclaimed water, or the like), a main pipe is laid from high to low, and a branch pipe is laid along a contour line. The joint of the main and branch pipes is provided with a water separator. A drip irrigation pipe or a drip irrigation belt is laid on the top of a greening unit, and a storage and drainage ditch is disposed at the bottom of the greening unit. In this method, irrigation, drainage, water discharge calculation, and water amount control and allocation are carried out by layer based on a height.

1. Calculation of Water Demand According to a Formula $R=R_p+R_h+R_w$.

(1) Calculation of Plants Water Demand

It is assumed that a total height of vertical greening design Z of a building is $H_{total}$, the greening design is divided into n greening units from high to low, the width and height of a $1^{st}$ greening unit $Z_1$ are $B_1$ and $H_1$ respectively, the width and height of a $2^{nd}$ greening unit $Z_2$ are $B_2$ and $H_2$ respectively, . . . , and the width and height of an $n^{th}$ greening unit $Z_n$ are $B_n$ and $H_n$ respectively. A total green plants water demand $R_p$ is calculated according to the following formula:

$$R_p = R_{p1} + R_{p2} + \cdots + R_{pn}$$

where $R_{p1}$, $R_{p2}$, . . . , and $R_{pn}$ represent water demands of respective units respectively, and may be calculated according to a formula $R_{pn}=B_n*H_n*q$ (q represents a rated urban greening water demand), or may be calculated based on climate data and plant species according to Penman formula.

(2) Calculation of Other Water Demand

The other water demand includes water demand $R_h$ of circulation operation to prevent the flexible externally-covered integrated greening system from freezing when an outside temperature is lower than 0° C., and an amount $R_w$ of water for flushing a pipe after fertilization, which are calculated according to the following formulas respectively:

$$R_h = V_h * S_{DN} * T_h$$
$$R_w = V_w * S_{DN} * T_w$$

where $V_h$ and $V_w$ represent a normal anti-freezing circulation velocity and a flushing velocity in the water pipe respectively, $T_h$ and $T_w$ represent normal anti-freezing circulation time and pipe flushing time respectively, and $S_{DN}$ represents cross-sectional area of the pipe.

2. Calculation of Unconventional Water Supply According to a Formula $Q=Q_p+Q_r+Q_e$.

(1) Available Rainwater Amount

The available rainwater amount is an amount $Q_p$ of rainwater that can be collected within an influence range of the system and that can be used after being treated, and is determined according to a formula $Q_p=I*S_p$, where I represents rainfall, and $S_p$ represents area in which rainwater can be collected by the system.

(2) Reclaimed Water Supply

The reclaimed water supply is mainly an amount $Q_r=Q_{r1}+Q_{r2}+\ldots+Q_{rn}$ of reclaimed water that can be reused after being treated within a coverage range of the system, a reclaimed water supply for each greening unit is determined based on a position of the greening unit, namely, $Q_{r1}$, $Q_{r2}$, . . . , and $Q_{rn}$, $Q_{rn}=\min\{Q_{rn\ measured},\ Q_{rn\ limit}\}$, $Q_{rn\ measured}$ represents an actually measured amount of domestic wastewater produced within a control range of the $n^{th}$ greening unit, and $Q_{rn\ limit}$ represents an upper limit of reclaimed water of the $n^{th}$ greening unit.

(3) Amount of Water for Emergent Replenishment

When a sum of the available rainwater amount and the reclaimed water supply is less than minimum water demand, running water or other water source can be used for emergent replenishment, and the amount of water for emergent replenishment is calculated according to a formula $Q_e=R_{lower}-Q_r-Q_p$, where $R_{lower}$ represents the minimum water demand.

3. Control and Allocation for Irrigation and Drainage.

Water supply and drainage pipes of the system are disposed in a three-dimensional manner, and potential energy of an altitude difference in a gravity field is used to effectively carry out precise irrigation, flushing and drainage control through irrigation and drainage regulation of the system.

(1) Allocation of Irrigation Water Amount

An irrigation water amount $I_n$ for each unit is calculated according to the following formula:

$$I_n = \begin{cases} R_{P_n} & R_P \leq Q \\ k*R_{P_n} & R_P > Q \end{cases}$$

where k represents a proportionality coefficient, and is preliminary estimated as $k=R_P/Q$, and $I_n \in (R_{pn\ lower}, R_{pn\ upper})$, and $R_{pn\ lower}$ and $R_{pn\ upper}$ represent upper and lower thresholds of plants water demand in the $n^{th}$ greening unit respectively, and is determined based on the plants, water holding capacity of a growth substrate layer in a greening system and climate condition.

(2) Calculation of Irrigation and Drainage Time

Irrigation time $T_n$ of each greening unit is calculated, including operation time $T_{pn}$ for water transmission and distribution and drip irrigation in the pipe and infiltration time $T_{in}$ in each greening unit, where corresponding calculation formulas are as follows:

$$T_{pn} = \frac{I_n}{S_{DN}} + \frac{I_n}{i_n * q_{dropper}}$$

$$T_{in} = \frac{I_n}{V_{in}}$$

where $T_n = T_{pn} + T_{in}$; $i_n$ represents a quantity of water droppers simultaneously enabled in the $n^{th}$ greening unit; $q_{dropper}$ represents a flow of a single water dropper in the $n^{th}$ greening unit; and $V_{in}$ represents an infiltration velocity of a growth substrate layer of the $n^{th}$ greening unit, and is actually measured or calculated according to a formula $V_{in} = K_n * J_n$, where $K_n$ represents an infiltration coefficient of the growth substrate layer of the $n^{th}$ greening unit, and $J_n$ represents a hydraulic gradient; and irrigation time T required for the entire flexible greening system is equal to $\max(T_1, T_2, T_3, T_4, \ldots, T_n)$.

(3) Water Discharge Determination and Destination

When the supply of the unconventional water source is greater than the water demand, the water discharge is Q=Q−R, and can be stored in a reservoir, and excess water can be directly used for surface greening and flushing, or directly discharged into a river to replenish ecological water and the like.

The method and system for vertically utilizing unconventional water source in the present disclosure have the following beneficial effects. Compared with the prior art, the method and system for vertically utilizing unconventional water source in the present disclosure have advantages of a simple structure, low costs, and high treatment efficiency. They effectively carry out precise irrigation, flushing, and drainage control based on an altitude difference, have a thermal insulation effect, efficiently utilize the unconventional water source, effectively save energy, and are suitable for decentralized treatment and recycling of urban domestic wastewater. The system is a treatment and reuse system for the urban domestic wastewater, which follows the concept of circular economy and green development. The system can not only effectively reclaim the wastewater, but also effectively allocate and utilize the rainwater, thereby significantly improving the unconventional water use efficiency.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and persons of ordinary skill in the art may still derive other accompanying drawings from these accompanying drawings without creative efforts.

IN THE FIGURES

1: water collection unit; 11: rainwater collection member; 111: housing; 112: water inlet pipe; 113: dust cover; 114: connecting rod; 115: floating ball; 12: domestic wastewater collection member; 121: first blowdown pipe; 122: second blowdown pipe; 2: water treatment unit; 21: biological reaction tank; 22: filler; 23: aeration apparatus; 24: temperature regulation member; 241: hollow pipe; 242: heater strip; 25: adsorption and filtration member; 3: monitoring, regulation and reuse unit; 31: reservoir; 32: communication pipe; 33: water pump; 34: sterilization member; 35: allocation member; 36: auxiliary apparatus; 37: control and allocation system; 4: water quality monitoring apparatus.

DETAILED DESCRIPTION

To make the to-be-resolved technical problems, the technical solutions, and the beneficial effects of the present disclosure clearer, the present disclosure is described in further detail below with reference to the accompanying drawings and embodiments. It should be understood that the specific embodiments described herein are merely intended to illustrate the present disclosure and are not intended to limit the present disclosure.

As shown in FIG. 1 to FIG. 4, a system for vertically utilizing unconventional water source in the present disclosure is described. The system for vertically utilizing unconventional water source includes a water collection unit 1, a water treatment unit 2, and a monitoring, regulation and reuse unit 3. The water collection unit 1 is configured to collect rainwater and/or domestic wastewater; the water treatment unit 2 is in communication with the water collection unit 1 and configured to purify the rainwater and/or the domestic wastewater collected by the water collection unit 1; and the monitoring, regulation and reuse unit 3 is in communication with the water treatment unit 3 and configured to use reclaimed water obtained through treatment by the water treatment unit 2.

Figure 1:
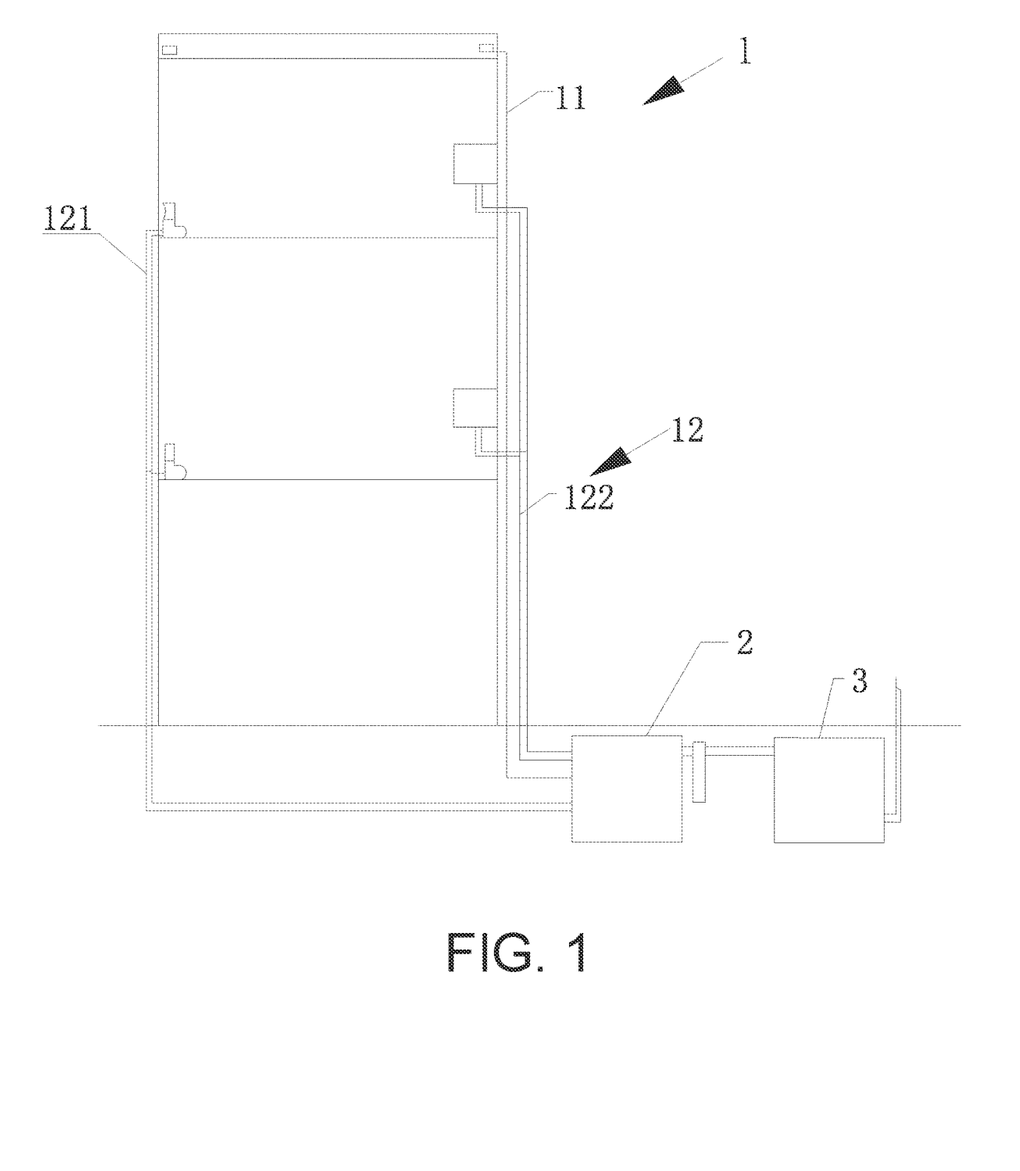
FIG. 1 is a schematic structural view of a system for vertically utilizing unconventional water source according to an embodiment of the present disclosure.
Figure 2:
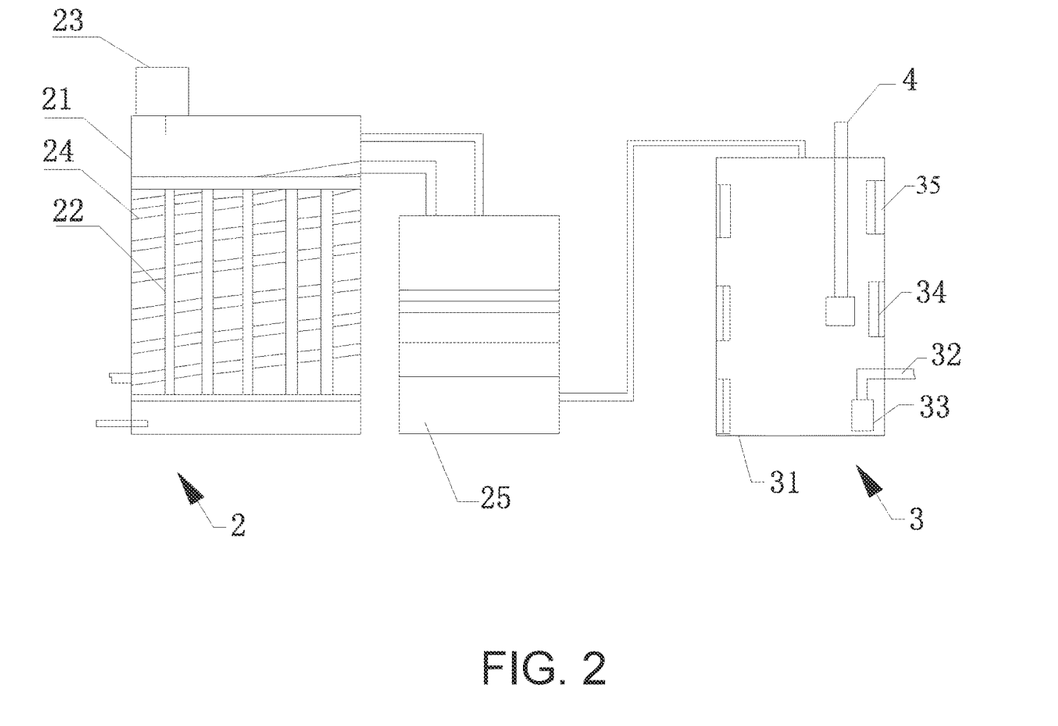
FIG. 2 is a schematic structural view of a water treatment unit and a monitoring, regulation and reuse unit in a system for vertically utilizing unconventional water source according to an embodiment of the present disclosure.
Figure 3:
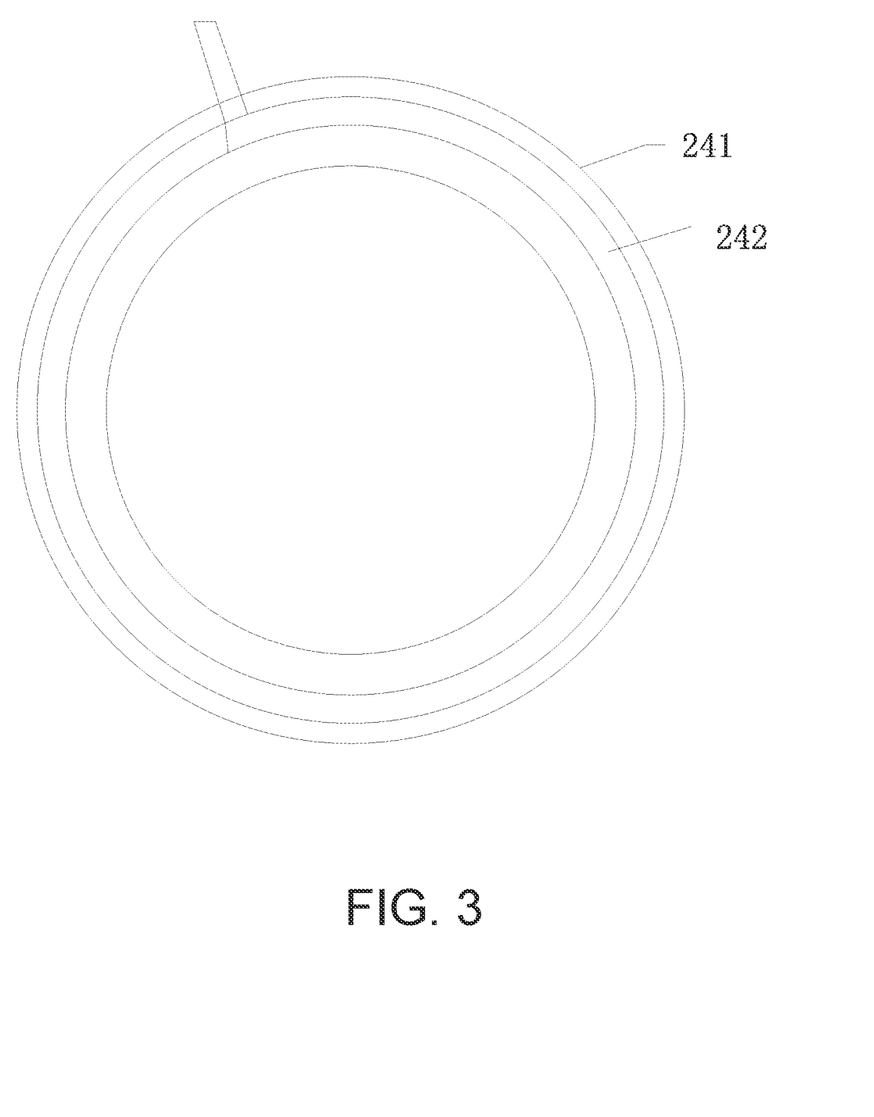
FIG. 3 is a schematic structural view of a temperature regulation member used in a system for vertically utilizing unconventional water source according to an embodiment of the present disclosure.

A treatment process is as follows. The rainwater and/or the domestic wastewater flows through the water collection unit 1, then flows into the water treatment unit 2 disposed on the ground of a community for treatment and purification, and then flows into the monitoring, regulation and reuse unit 3 for recycling.

Compared with the prior art, the system for vertically utilizing unconventional water source in the present disclosure is miniaturized and highly integrated, and has advantages of a simple structure, low costs, and high water resource treatment efficiency. It effectively saves energy and water resources, and is suitable for decentralized treatment and recycling of urban domestic wastewater. The system is a treatment and reuse system for the urban domestic wastewater, which follows the concept of circular economy and green development. The system can not only effectively reclaim the wastewater, but also effectively allocate and utilize the rainwater, thereby significantly improving utilization efficiency of unconventional water source.

In an embodiment, as shown in FIG. 1 to FIG. 4, the water treatment unit 2 includes a biological reaction tank 21, a filler 22, an aeration apparatus 23, and a temperature regulation member 24. The biological reaction tank 21 is in communication with the water collection unit 1. The filler 22 is disposed in the biological reaction tank 21 and used as a biofilm carrier. The aeration apparatus 23 is configured to fill oxygen into liquid in the biological reaction tank 21. The temperature regulation member 24 is arranged in the biological reaction tank 21 and configured to regulate a temperature in the biological reaction tank 21.

During start-up and operation, most solid biofilms are attached to the filler 22 and are in sufficient contact with the oxygen supplemented into water body in the biological reaction tank 21 by means of the aeration apparatus 23, to perform biological oxidation for wastewater treatment. In addition, there is also a small amount of suspended 2%-5% activated sludge in the biological reaction tank 21 to purify organic matter. The water treatment unit 2 in the present disclosure mainly relies on an adsorption, retention and separation function and a biological chain purification function of the filler 22 and the biofilm attached to the filler 22. Microorganisms grow stably under an aerobic condition to form the biofilm attached to a surface of the filler 22. The filler 22 and its attached biofilm can adsorb, retain and separate a large-grained organic pollutant. In addition, a microbial population structure gradually changes along a water flow direction in the biological reaction tank 21 and inner and outer layers of the film to form a multi-level biological chain that can prey on organic matter by level and completely and effectively biodegrade organic matter in the wastewater. Growth, metabolism, and reproduction of the microorganism are controlled by a water temperature. For example, the temperature range from 25° C. to 35° C. is a most suitable temperature range for a denitrification function of a nitrobacterium. The water treatment unit 2 can adjust the water temperature in the biological reaction tank 21 in time by means of the temperature regulation member 24.

In this embodiment, the filler 22 may be in the shape of a honeycomb tube, a bundle, a ripple, a mesh, a plate, a ball, or the like; may be hard, semi-soft, or soft; and may be made of plastic, glass fiber reinforced plastic, or fiber. The shape and material of the filler 22 are not unique, provided that it can serve as a carrier for biofilm attachment and intercept a part of suspended substances in the wastewater.

In this embodiment, the aeration apparatus 23 includes a blast blower, and the blast blower (air compressor) is used to fill certain pressured air (oxygen) into the water treatment unit 2 for blast aeration. This method has low power consumption and high efficiency, makes it easy to control an aeration rate, and can enable a fallen biofilm to be precipitated and discharged slowly.

In this embodiment, the aeration apparatus 23 is in an intermittent aeration mode. Aeration stop time of intermittent operation is 3.5 h, and aeration time is 7 h. In an actual use process, after the aeration stop time reaches 3.5 h, chemical oxygen demand, ammonia nitrogen, total phosphorus, and total nitrogen concentration do not decrease obviously, and tend to be stable. When the aeration time reaches 7 h, the chemical oxygen demand and the ammonia nitrogen do not decrease obviously, and tend to be stable. Therefore, when the aeration stop time of intermittent operation is 3.5 h and the aeration time is 7 h, the aeration apparatus 23 achieves highest working efficiency.

In an example, as shown in FIG. 1 and FIG. 2, the water treatment unit 2 further includes an absorption and filtration member 25. The reclaimed water flows into the monitoring, regulation and reuse unit 3 through the pipe after being degraded by the microorganism in the biological reaction tank 21 and filtered by the adsorption and filtration member 25. The adsorption and filtration member 25 serves to remove a suspended substance in the reclaimed water.

In this embodiment, the adsorption and filtration member 25 is layered, including a sand-gravel layer, a waste cotton layer, a biochar layer, and a waste cotton layer.

In this embodiment, as shown in FIG. 1 and FIG. 2, the monitoring, regulation and reuse unit 3 includes a reservoir 31, a water pump 33, and a communication pipe 32. The water pump 33 is disposed in the reservoir 31. One end of the communication pipe 32 is in communication with the water pump 33, and the other end of the communication pipe 32 is in communication with a community irrigation system and/or a non-drinkable water system.

In an example, the monitoring, regulation and reuse unit 3 further includes a sterilization member 34 and/or an allocation member 35 configured to control irrigation and drainage processes. The sterilization member 34 performs sterilization and disinfection by using an ultraviolet lamp that is in communication with an external power supply. The sterilization member 34 effectively removes the microorganism in the reclaimed water and improves water quality.

In this embodiment, as shown in FIG. 1 to FIG. 4, the water collection unit 1 includes a rainwater collection member 11 and a domestic wastewater collection member 12. The rainwater collection member 11 is disposed on a building roof and/or on the ground to collect the rainwater and transport the rainwater to the water treatment unit 2. One end of the domestic wastewater collection member 12 is in communication with a sewer pipe in a building, and the other end of the domestic wastewater collection member 12 is in communication with the water treatment unit 2. The water collection unit 1 can collect both the rainwater and the domestic wastewater, to effectively improve use ratios of the rainwater and the domestic wastewater.

Figure 4:
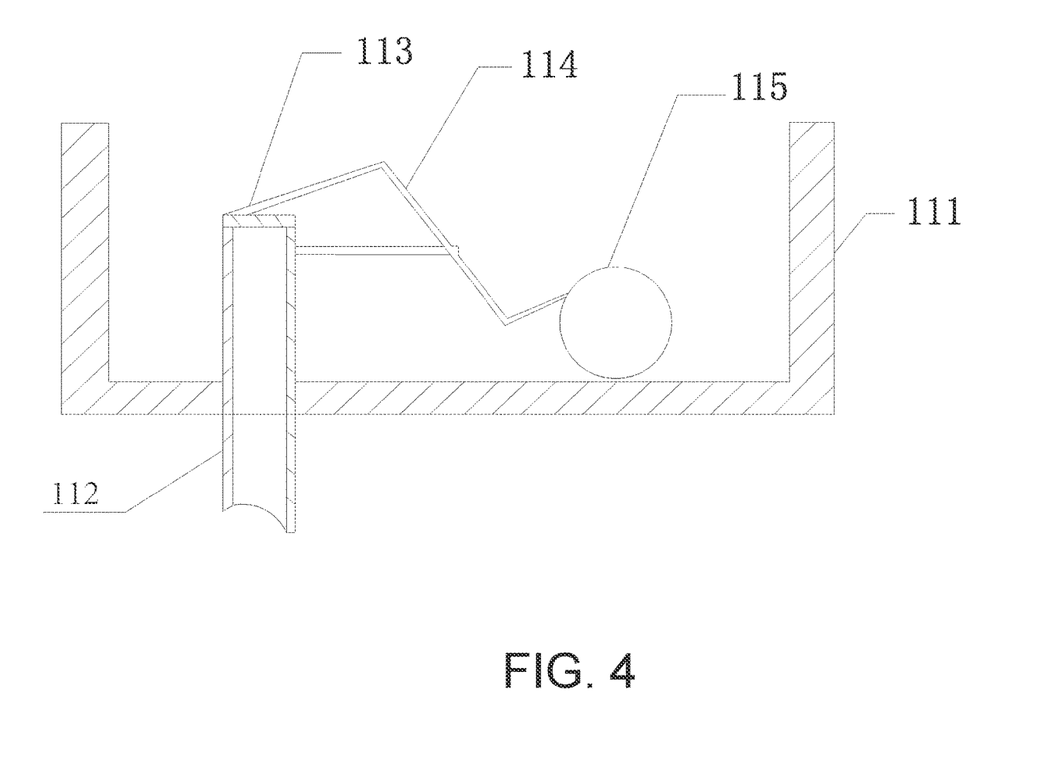
FIG. 4 is a schematic sectional structural view of a suction collecting head used in a system for vertically utilizing unconventional water source according to an embodiment of the present disclosure.

In this embodiment, the rainwater collection member 11 includes several suction collecting heads disposed on the roof or bottom surface, and a water supply pipe with one end in communication with the suction collecting head and the other end in communication with the water treatment unit 2. The suction collecting head includes a housing 111 opened at one end, a water inlet pipe 112 disposed in the housing 111 and in communication with the water supply pipe, a dust cover 113 rotatably in communication with a water inlet of the water inlet pipe 112, a connecting rod 114 with one end in communication with the dust cover 113 and the other end as a free end and rotatably in communication with the water inlet pipe 112 at the middle position, and a floating ball 115 hinged with the free end of the connecting rod 114 and located in the housing 111. The opening of the water inlet pipe 112 of the suction collecting head may be opened in rainy days to allow rain water to enter the water supply pipe, and in sunny days the opening of the water inlet pipe 112 may be closed by the dust cover 113 to prevent dust from entering the water supply pipe.

In this embodiment, the bottom of the housing 111 is provided with a limber hole. The limber hole avoids gathering of rainwater that does not enter the water supply pipe through the water inlet pipe 112.

In this embodiment, the domestic wastewater collection member 12 includes a first blowdown pipe 121 and a second blowdown pipe 122. One end of the first blowdown pipe 121 is in communication with a blowdown pipe in toilet, and the other end of the first blowdown pipe 121 is in communication with the biological reaction tank 21. One end of the second blowdown pipe 122 is in communication with a blowdown pipe in kitchen, and the other end of the second blowdown pipe 122 is in communication with the absorption and filtration member 25. Wastewater is usually generated in a process of washing vegetables and hands in kitchen, which is cleaner than that in toilet. The second blowdown pipe 122 does not pass through the biological reaction tank 21 and is directly in communication with the adsorption and filtration member 25, reducing workload of the biological reaction tank 21.

In this embodiment, the temperature regulation member 24 includes a hollow pipe 241 and a heater strip 242. The hollow pipe 241 is disposed in the biological reaction tank 21, where one end of the hollow pipe 241 is in communication with the rainwater collection member 11, and the other end of the hollow pipe 241 is in communication with the absorption and filtration member 25. The heater strip 242 is configured to connect to an external power supply to heat the hollow pipe 241. The rainwater collected by the rainwater collection member 11 directly enters the hollow pipe 241 and flows into the adsorption and filtration member 25 for filtering. The rainwater and the domestic wastewater are treated by classification, which effectively reduces the workload of the biological reaction tank 21, avoids unnecessary treatment steps, and improves operation efficiency of the system.

In an example, the hollow pipe 241 is constituted by two pipes disposed coaxially. There is a gap formed between the two pipes, and two ends are sealed. The heater strip 242 is disposed in the gap between the two pipes.

In an example, as shown in FIG. 2, a water quality monitoring apparatus 4 is disposed in the reservoir 31 to monitor the water quality.

In this embodiment, power can be provided by means of a water pump structure during water transportation.

Figure 5:
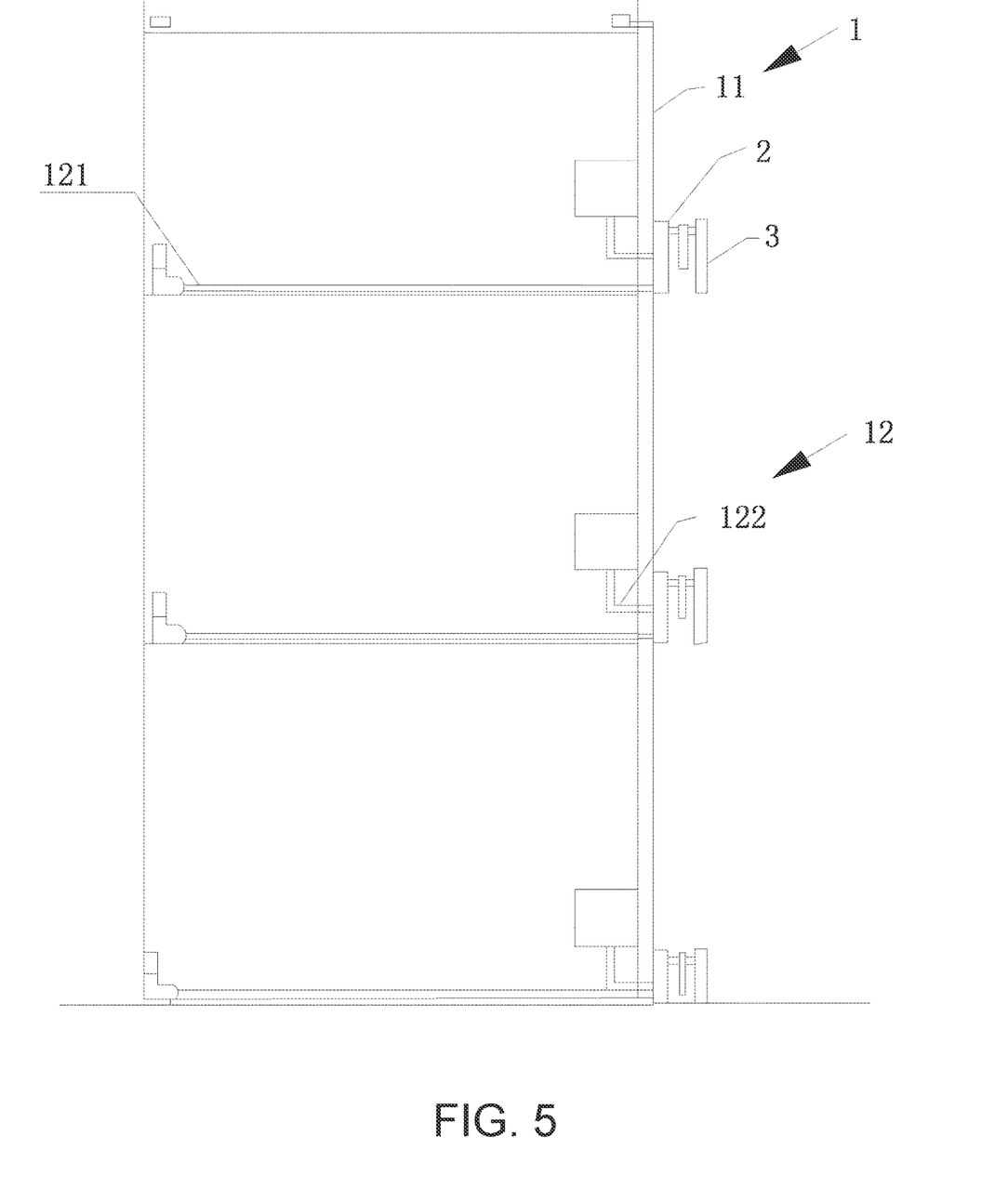
FIG. 5 is a schematic structural view of a system for vertically utilizing unconventional water source according to another embodiment of present disclosure.
Figure 6:
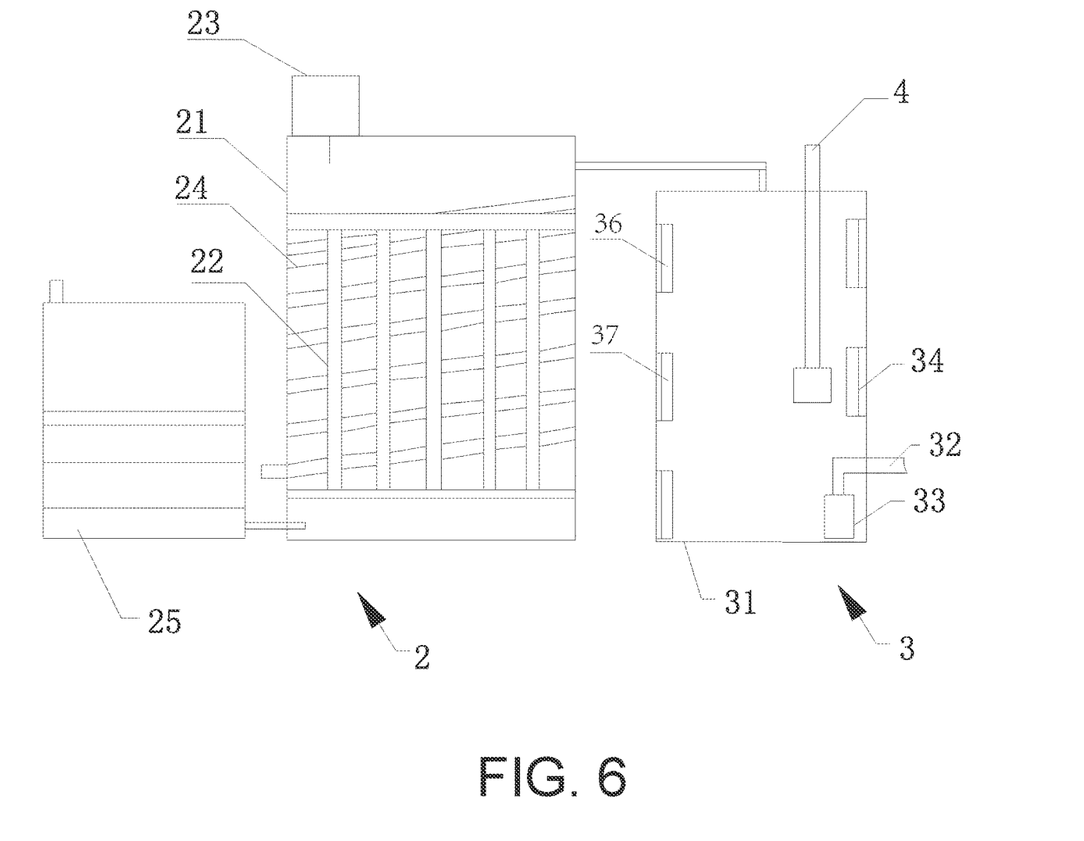
FIG. 6 is a schematic structural view of a water treatment unit and a monitoring, regulation and reuse unit in the system for vertically utilizing unconventional water source in FIG. 5.

As shown in FIG. 5 and FIG. 6, another system for vertically utilizing unconventional water source in the present disclosure is described. A structure of the system for vertically utilizing unconventional water source in this embodiment is basically the same as that of the above-mentioned system for vertically utilizing unconventional water source. In this embodiment, an adsorption and filtration member 25 is in communication with a water collection unit 1, a biological reaction tank 21 is in communication with the adsorption and filtration member 25, and a monitoring, regulation and reuse unit 3 is in communication with the biological reaction tank 21. Water collected by the water collection unit 1 is pretreated by the adsorption and filtration member 25 before entering the biological reaction tank 21 for advanced treatment. The water treatment unit 2 provides pretreatment and advanced treatment, to perform stage treatment on unconventional water source, and is in communication with the water collection unit 1 to purify rainwater and/or domestic wastewater collected by the water collection unit 1. The adsorption and filtration member 25 is structurally layered, and preliminarily treats the collected rainwater and wastewater through filtration and sedimentation. Treated water can be reused directly after it is qualified.

In this embodiment, the adsorption and filtration member 25 is in communication with a rainwater collection member 11 through a first pipe, and in communication with a domestic wastewater collection member 12 through a second pipe. The first pipe and the second pipe each are provided with a filtration member for filtering an impurity. Regions for treating the rainwater and the domestic wastewater are separated by a dummy plate in the adsorption and filtration member 25, and the adsorption and filtration member 25 is provided with a Y-shaped branch pipe in communication with a user's water supply system. One branch of the Y-shaped branch pipe is in communication with the user's water supply system; one branch of the Y-shaped branch pipe is in communication with the region for treating the rainwater, and the branch is provided with a water quality monitoring apparatus and a branch control valve controlled by the water quality monitoring apparatus; and the remaining branch is in communication with the region for treating the domestic wastewater, and the branch is provided with a water quality monitoring apparatus and a branch control valve controlled by the water quality monitoring apparatus. In this way, when the rainwater and/or the domestic wastewater flows into the corresponding branch after being treated by the adsorption and filtration member 25. The water quality monitoring apparatus monitors the water quality in the corresponding branch. When the treated water is qualified, the branch control valve is opened to make the water flow into the user's water supply system for use. When the treated water is unqualified, the branch control valve is not opened, and the water flows into the biological reaction tank 21 for advanced treatment. The water quality monitoring apparatus monitors the water quality in the branch in real time to ensure that the branch control valve is opened or closed in time.

In this embodiment, the first pipe is provided with a first branch pipe at a position where the filtration member is disposed, and the first branch pipe is in communication with the biological reaction tank 21, and is disposed obliquely relative to the first pipe. A position at which the first branch pipe and the first pipe are connected is provided with an electric control valve. The electric control valve is automatically opened or closed based on acting force of sundries accumulated in the first pipe on the electric control valve. When the acting force of the sundries on the electric control valve reaches a preset threshold, it indicates that too many sundries are accumulated in the first pipe. In this case, the electric control valve is opened, and the sundries accumulated in the first pipe flow into the first branch pipe under the action of a water flow in the first pipe and finally into the biological reaction tank 21 for treatment. After the sundries flow into the first branch pipe, the electric control valve is closed automatically.

Similarly, in this embodiment, the second pipe is provided with a second branch pipe at a position where the filtration member is disposed, and the second branch pipe is in communication with the biological reaction tank 21, and is disposed obliquely relative to the second pipe. A position at which the second branch pipe and the second pipe are connected is provided with an electric control valve. The electric control valve is automatically opened or closed based on acting force of sundries accumulated in the second pipe on the electric control valve. When the acting force of the sundries on the electric control valve reaches the preset threshold, it indicates that too many sundries are accumulated in the second pipe. In this case, the electric control valve is opened, and the sundries accumulated in the second pipe flow into the second branch pipe under the action of water flow in the second pipe and finally into the biological reaction tank 21 for treatment. After the sundries flow into the second branch pipe, the electric control valve is closed automatically.

It should be noted that the preset threshold needs to be set based on the first branch pipe, the first pipe, and a sundry type.

In this embodiment, the water treatment unit 2 and the monitoring, regulation and reuse unit 3 are disposed separately for each floor or household of a residential building. This makes the system for vertically utilizing unconventional water source miniaturized and convenient to use. In addition, the system is further characterized by low energy consumption and high economic benefits.

In this embodiment, the monitoring, regulation and reuse unit 3 further includes water quality monitoring members respectively disposed in the adsorption and filtration member 25, a reservoir 31, the biological reaction tank 21, the rainwater collection member 11, and the domestic wastewater collection member 12. The water quality monitoring members are convenient for a user to monitor the water quality and amount of the water flow in the system.

In this embodiment, the monitoring, regulation and reuse unit 3 further includes an auxiliary apparatus 36 configured to monitor the water quality, amount, and temperature, and a control and allocation system 37. The control and allocation system is configured to control irrigation and drainage processes. According to a method for vertically utilizing unconventional water source in the present disclosure, the monitoring, regulation and reuse unit 3 calculates water demand and water supply, and performs control and allocation for irrigation and drainage.

The present disclosure further provides a method for vertically utilizing unconventional water source, including the following steps:

S1: Calculating water demand (a sum of plants water demand and other water demand).

S2: Calculating unconventional water supply (a sum of available rainwater amount, a reclaimed water supply, and an amount of water for emergent replenishment).

S3: Performing control and allocation for irrigation and drainage processes.

Specifically, the method for vertically utilizing unconventional water source in the present disclosure is as follows:

In the present disclosure, based on a flexible externally-covered integrated greening system proposed by the inventor, an unconventional water source system is disposed based on a greening position, slope, and characteristic. To make full use of potential energy of a three-dimensional altitude difference, based on a position of the unconventional water source (the rainwater or the reclaimed water), a main pipe is laid from high to low, and a branch pipe is laid along a contour line. A position at which the main and branch pipes are connected is provided with a water separator. A drip irrigation pipe or a drip irrigation belt is laid on the top of a greening unit, and a storage and drainage ditch is disposed at the bottom of the greening unit. In this method, irrigation, drainage, water discharge calculation, and water amount control and allocation are carried out by layer based on a height.

1. Calculation of Water Demand According to a Formula $R=R_p+R_h+R_w$.

(1) Calculation of Plants Water Demand

It is assumed that a total height of vertical greening design Z of a building is $H_{total}$, the greening design is divided into n greening units from high to low, the width and height of a $1^{st}$ greening unit $Z_1$ are $B_1$ and $H_1$ respectively, the width and height of a $2^{nd}$ greening unit $Z_2$ are $B_2$ and $H_2$ respectively, . . . , and the width and height of an $n^{th}$ greening unit $Z_n$ are $B_n$ and $H_n$ respectively. A total green plants water demand $R_p$ is calculated according to the following formula:

$$R_p = R_{p1} + R_{p2} + \cdots + R_{pn}$$

where $R_{p1}$, $R_{p2}$, . . . , and $R_{pn}$ represent water demands of various units respectively, and may be calculated according to a formula $R_{pn}=B_n*H_n*q$ (q represents a rated urban greening water demand), or may be calculated based on climate data and plant species according to Penman formula.

(2) Calculation of Other Water Demand

The other water demand includes water demand $R_h$ of circulation operation to prevent the flexible externally-covered integrated greening system from freezing when an outside temperature is lower than 0° C., and an amount $R_w$ of water for flushing a pipe after fertilization, which are calculated according to the following formulas respectively:

$$R_h = V_h * S_{DN} * T_h$$
$$R_w = V_w * S_{DN} * T_w$$

where $V_h$ and $V_w$ represent a normal anti-freezing circulation velocity and a flushing velocity in the water pipe respectively, $T_h$ and $T_w$ represent normal anti-freezing circulation time and pipe flushing time respectively, and $S_{DN}$ represents cross-sectional area of the pipe.

2. Calculation of Unconventional Water Supply According to a Formula $Q=Q_p+Q_r+Q_e$, Including Available Rainwater Amount, Reclaimed Water Supply, and an Amount of Water for Emergent Replenishment.

(1) Available Rainwater Amount

The available rainwater amount is an amount $Q_p$ of rainwater that can be collected within an influence range of the system and that can be used after being treated, and is calculated according to a formula $Q_p=I*S_p$, where I represents rainfall, and $S_p$ represents area in which rainwater can be collected by the system.

(2) Reclaimed Water Supply

The reclaimed water supply is mainly an amount $Q_r=Q_{r1}+Q_{r2}+\ldots+Q_{rn}$ of reclaimed water that can be reused after being treated within a coverage range of the system, a reclaimed water supply for each greening unit is determined based on a position of the greening unit, namely, $Q_{r1}$, $Q_{r1}$, . . . , and $Q_{rn}$, $Q_{rn}=\min\{Q_{rn\ measured}, Q_{rn\ limit}\}$, $Q_{rn\ measured}$ represents an actually measured amount of domestic wastewater produced within a control range of the $n^{th}$ greening unit, and $Q_{rn\ limit}$ represents an upper limit of a reclaimed water treatment unit of the $n^{th}$ greening unit.

(3) Amount of Water for Emergent Replenishment

When a sum of the available rainwater amount and the reclaimed water supply is less than a minimum water demand, tap water or other water source can be used for emergent replenishment, and the amount of water for emergent replenishment is calculated according to a formula $Q_e=R_{lower}-Q_r-Q_p$, where $R_{lower}$ represents the minimum water demand.

3. Control and Allocation for Irrigation and Drainage.

Water supply and drainage pipes of the system are disposed in a three-dimensional manner, and potential energy of an altitude difference in a gravity field is used to effectively carry out precise irrigation, flushing and drainage control through irrigation and drainage regulation of the system, and the following steps are included:

(1) Allocation of Irrigation Water Amount

An irrigation water amount $I_n$ for each unit is calculated according to the following formula:

$$I_n = \begin{cases} R_{Pn} & R_P \leq Q \\ k*R_{Pn} & R_P > Q \end{cases}$$

where k represents a proportionality coefficient, and is preliminary estimated as $k=R_P/Q$; and $I_n \in (R_{pnlower}, R_{pn\ upper})$, and $R_{pn\ lower}$ and $R_{pn\ upper}$ represent upper and lower thresholds of plants water demand in the $n^{th}$ greening unit respectively, and is determined based on the plants, a water holding capacity of a growth substrate layer in a greening system and a climatic condition.

(2) Calculation of Irrigation and Drainage Time

Irrigation time $T_n$ of each greening unit is calculated, including operation time $T_{pn}$ for water transmission and distribution and drip irrigation in the pipe and infiltration time $T_{in}$ in each greening unit, where corresponding calculation formulas are as follows:

$$T_{pn} = \frac{I_n}{S_{DN}} + \frac{I_n}{i_n * q_{dropper}}$$

$$T_{in} = \frac{I_n}{V_{in}}$$

where $T_n=T_{pn}+T_{in}$; $i_n$ represents a quantity of water droppers simultaneously enabled in the $n^{th}$ greening unit; $q_{dropper}$ represents a flow of a single water dropper in the $n^{th}$ greening unit; and $V_{in}$ represents an infiltration velocity of a growth substrate layer of the $n^{th}$ greening unit, and is set to an actually measured value or calculated according to a formula $V_{in}=K_n*J_n$, where $K_n$ represents an infiltration coefficient of the growth substrate layer of the $n^{th}$ greening unit, and $J_n$ represents a hydraulic gradient; and irrigation time T required for the entire flexible greening system is equal to $\max(T_1, T_2, T_3, T_4, \ldots, T_n)$.

(3) Water Discharge Determination and Destination

When the supply of the unconventional water source is greater than the water demand, the water discharge is Q=Q−R, and can be stored in a reservoir, and excess water can be directly used for surface greening and flushing, or directly discharged into a river to replenish ecological water and the like.

The above described are merely preferred embodiments of the present disclosure, and are not intended to limit the present disclosure. Any modification, equivalent substitution and improvement without departing from the spirit and principle of the present disclosure shall be included within the protection scope of the present disclosure.

The invention claimed is:

1. A method for vertically utilizing an unconventional water source, using a system for vertically utilizing unconventional water source, comprising steps of:

(I) calculating water demand according to a formula $R=R_p+R_h+R_w$, comprising:

(i) calculating plants water demand, wherein assuming that a total height of vertical greening design Z of a building is $H_{total}$, the greening design is divided into n greening units from high to low, a width and a height of a $1^{st}$ greening unit $Z_1$ are $B_1$ and $H_1$ respectively, a width and a height of a $2^{nd}$ greening unit $Z_2$ are $B_2$ and $H_2$ respectively, . . . , and a width and a height of an $n^{th}$ greening unit $Z_n$ are $B_n$ and $H_n$ respectively, a total green plants water demand $R_p$ is calculated according to the following formula:

$$R_p=R_{p1}+R_{p2}+\ldots+R_{pn},$$

wherein $R_{p1}, R_{p2}, \ldots,$ and $R_{pn}$ represent water demands of respective units respectively, and are calculated according to a formula $R_{pn}=B_n*H_n*q$ (q represents a rated urban greening water demand), or are calculated based on climate data and plant species according to Penman formula; and (ii) calculating other water demand, comprising:

calculating water demand $R_h$ of circulation operation when an outside temperature is lower than 0° C., and an amount $R_w$ of water for flushing a pipe after fertilization, according to the following formulas respectively:

$$R_h=V_h*S_{DN}*T_h$$

$$R_w=V_w*S_{DN}*T_w$$

wherein $V_h$ and $V_w$ represent a normal anti-freezing circulation velocity and a flushing velocity in the water pipe respectively, $T_h$ and $T_w$ represent normal anti-freezing circulation time and pipe flushing time respectively, and $S_{DN}$ represents cross-sectional area of the pipe;

(II) calculating unconventional water supply according to a formula $Q=Q_p+Q_r+Q_e$, comprising:

(i) calculating an amount of available rainwater, wherein the amount of available rainwater is an amount $Q_p$ of rainwater that is used after being collected by means of a water collection unit provided by the system within an influence range of the system and treated by means of a water treatment unit provided by the system, and is calculated according to a formula $Q_p=I*S_p$, wherein I represents rainfall, and $S_p$ represents area in which rainwater is collected by the system, wherein the water treatment unit is in communication with the water collection unit;

(ii) calculating a reclaimed water supply, wherein the reclaimed water supply is mainly an amount $Q_r=Q_{r1}+Q_{r2}+\ldots+Q_{rn}$ of reclaimed water that is reused after being collected by means of the water collection unit and treated by means of the water treatment unit within a coverage range of the system, a reclaimed water supply for each greening unit is determined based on a position of the greening unit, namely, $Q_{r1}, Q_{r1}, \ldots,$ and $Q_{rn}, Q_{rn}=\min\{Q_{rn\ measured}, Q_{rn\ limit}\}$, $Q_{rn\ measured}$ represents an actually measured amount of domestic wastewater produced within a control range of the $n^{th}$ greening unit, and $Q_{rn\ limit}$ presents an upper limit of a reclaimed water treatment unit of the $n^{th}$ greening unit; and (iii) calculating an amount of water for emergent replenishment, wherein when a sum of the amount of available rainwater and the reclaimed water supply is less than a minimum water demand, running water or other water source is used for emergent replenishment, and the amount of water for emergent replenishment is calculated according to a formula $Q_e=R_{lower}-Q_r-Q_p$, where $R_{lower}$ represents the minimum water demand; and (III) performing control and allocation for irrigation and drainage by means of a monitoring, regulation and reuse unit provided by the system, wherein the monitoring, regulation and reuse unit is in communication with the water treatment unit and is configured to use rainwater and reclaimed water obtained through treatment by the water treatment unit, water supply and drainage pipes of the system are disposed in a three-dimensional manner, and potential energy of an altitude difference in a gravity field is used to effectively carry out precise irrigation, flushing and drainage control through irrigation and drainage regulation of the system by means of the monitoring, regulation and reuse unit, and following steps are comprised;

(i) allocating an irrigation water amount, comprising:

calculating an irrigation water amount $I_n$ for each unit according to the following formula:

$$I_n = \begin{cases} R_{Pn} & R_P \le Q \\ k*R_{Pn} & R_P > Q \end{cases}$$

wherein k represents a proportionality coefficient, and is preliminary estimated as $k=R_P/Q$; and $I_n \in (R_{pnlower}, R_{pn\ upper})$, and $R_{pn\ lower}$ and $R_{pn\ upper}$ represent upper and lower thresholds of plants water demand in the $n^{th}$ greening unit respectively, and is determined based on the plants, a water holding capacity of a growth substrate layer in a greening system and a climatic condition;

(ii) calculating irrigation and drainage time, comprising:
calculating irrigation time $T_n$ of each greening unit, comprising operation time $T_{pn}$ for water transmission and distribution and drip irrigation in the pipe and infiltration time $T_{in}$ in each greening unit, wherein corresponding calculation formulas are as follows:

$$T_{pn} = \frac{I_n}{S_{DN}} + \frac{I_n}{i_n * q_{dropper}}$$

$$T_{in} = \frac{I_n}{V_{in}}$$

wherein $T_n=T_{pn}+T_{in}$; $i_n$ represents a quantity of water droppers simultaneously enabled in the $n^{th}$ greening unit; $q_{dropper}$ represents a flow of a single water dropper in the $n^{th}$ greening unit; and $V_{in}$ represents an infiltration velocity of a growth substrate layer of the $n^{th}$ greening unit, and is set to an actually measured value or calculated according to a formula $V_{in}=K_n*J_n$, where $K_n$ represents an infiltration coefficient of the growth substrate layer of the $n^{th}$ greening unit, and $J_n$ represents a hydraulic gradient; and irrigation time T required for the entire flexible greening system is equal to max $(T_1, T_2, T_3, T_4, \ldots, T_n$; and (iii) determining a water discharge and a destination, wherein when the supply of the unconventional water source is greater than the water demand, the water discharge is Q=Q−R, and is stored in a reservoir of the monitoring, regulation and reuse unit, and excess water is directly used for surface greening and flushing, or directly discharged into a river to replenish ecological water and the like.

2. The method according to claim 1, wherein the water treatment unit of the system for vertically utilizing unconventional water source used by the method comprises:
a biological reaction tank, in communication with the water collection unit;
a filler, disposed in the biological reaction tank and used as a biofilm carrier;
an aeration apparatus, configured to oxygenate a liquid in the biological reaction tank; and
a temperature regulation member, disposed in the biological reaction tank and configured to regulate a temperature in the biological reaction tank.

3. The method according to claim 2, wherein the water treatment unit of the system for vertically utilizing unconventional water source used by the method further comprises an adsorption and filtration member for removing a suspended substance from the reclaimed water.

4. The method according to claim 3, wherein the monitoring, regulation and reuse unit of the system for vertically utilizing unconventional water source used by the method comprises:
a water pump, disposed in the reservoir; and
a communication pipe having one end in communication with the reservoir and another end configured to communicate with a community irrigation system and/or a non-drinkable water system.

5. The method according to claim 4, wherein the monitoring, regulation and reuse unit of the system for vertically utilizing unconventional water source used by the method further comprises a sterilization member for removing a microorganism from the reclaimed water and/or an allocation member configured to control irrigation and drainage processes.

6. The method according to claim 4, wherein the water collection unit of the system for vertically utilizing unconventional water source used by the method comprises:
a rainwater collection member, disposed on a building roof and/or ground to collect the rainwater and transport the rainwater to the water treatment unit; and
a domestic wastewater collection member having one end in communication with a sewer pipe in a building and another end in communication with the water treatment unit.

7. The method according to claim 6, wherein the domestic wastewater collection member of the system for vertically utilizing unconventional water source used by the method comprises:
a first blowdown pipe having one end in communication with a blowdown pipe in toilet and another end in communication with the biological reaction tank; and
a second blowdown pipe having one end in communication with a blowdown pipe in kitchen and another end in communication with the absorption and filtration member.

8. The method according to claim 6, wherein the temperature regulation member of the system for vertically utilizing unconventional water source used by the method comprises:
a hollow pipe, disposed in the biological reaction tank, wherein one end of the hollow pipe is in communication with the rainwater collection member, and another end of the hollow pipe is in communication with the monitoring, regulation and reuse unit; and
a heater strip, connected to an external power supply to heat the hollow pipe.

9. The method according to claim 8, wherein the monitoring, regulation and reuse unit of the system for vertically utilizing unconventional water source used by the method further comprises an apparatus configured to monitor water quality, water amount, and water temperature, and a control and allocation system.

* * * * *